United States Patent [19]

Rodde et al.

[11] Patent Number: 4,522,059
[45] Date of Patent: Jun. 11, 1985

[54] FLOWMETER AND INSTALLATION FOR MIXING AN ADDITIVE IN A LIQUID

[75] Inventors: Christian Rodde, Palaiseau; Jean Desarnaud, Vanves, both of France

[73] Assignee: Octel S.A., Paris, France

[21] Appl. No.: 463,250

[22] Filed: Feb. 2, 1983

[30] Foreign Application Priority Data

Feb. 3, 1982 [FR] France .................................. 82 01708

[51] Int. Cl.$^3$ ............................................. G01F 3/24
[52] U.S. Cl. ........................................ 73/223; 222/55
[58] Field of Search ..................... 73/223, 861, 3, 216, 73/224; 222/55, 56, 57

[56] References Cited

U.S. PATENT DOCUMENTS

| | | | |
|---|---|---|---|
| 2,853,877 | 9/1958 | Smith | 73/224 |
| 3,324,707 | 6/1967 | Charbonnier | 73/3 |
| 3,835,700 | 9/1974 | Gamble | 73/223 X |
| 4,013,194 | 3/1977 | Moscarini | 73/223 X |

FOREIGN PATENT DOCUMENTS 2448129 10/1980 France .................................. 73/224

Primary Examiner—James L. Rowland
Assistant Examiner—Brian R. Tumm
Attorney, Agent, or Firm—Brisebois & Kruger

[57] ABSTRACT

A flowmeter has a tank disposed between a discharge circuit and a supply circuit from which the tank is refilled when the level of the liquid in the tank falls below a predetermined level. A plunger is suspended in the tank by a force sensor. The output of the force sensor is used to measure the rate of flow from the tank to the discharge circuit except when the tank is being refilled. Flow from the tank during a refilling cycle is approximately measured in response to flow parameters in the discharge circuit which are independent of the force sensor and liquid level in the tank. The flow parameters in the discharge circuit are monitored and calibrated during each tank discharge cycle, and the new calibration values are used during the next tank refilling cycle, to obtain reasonably accurate continued flow measurement during each tank refilling cycle.

13 Claims, 1 Drawing Figure

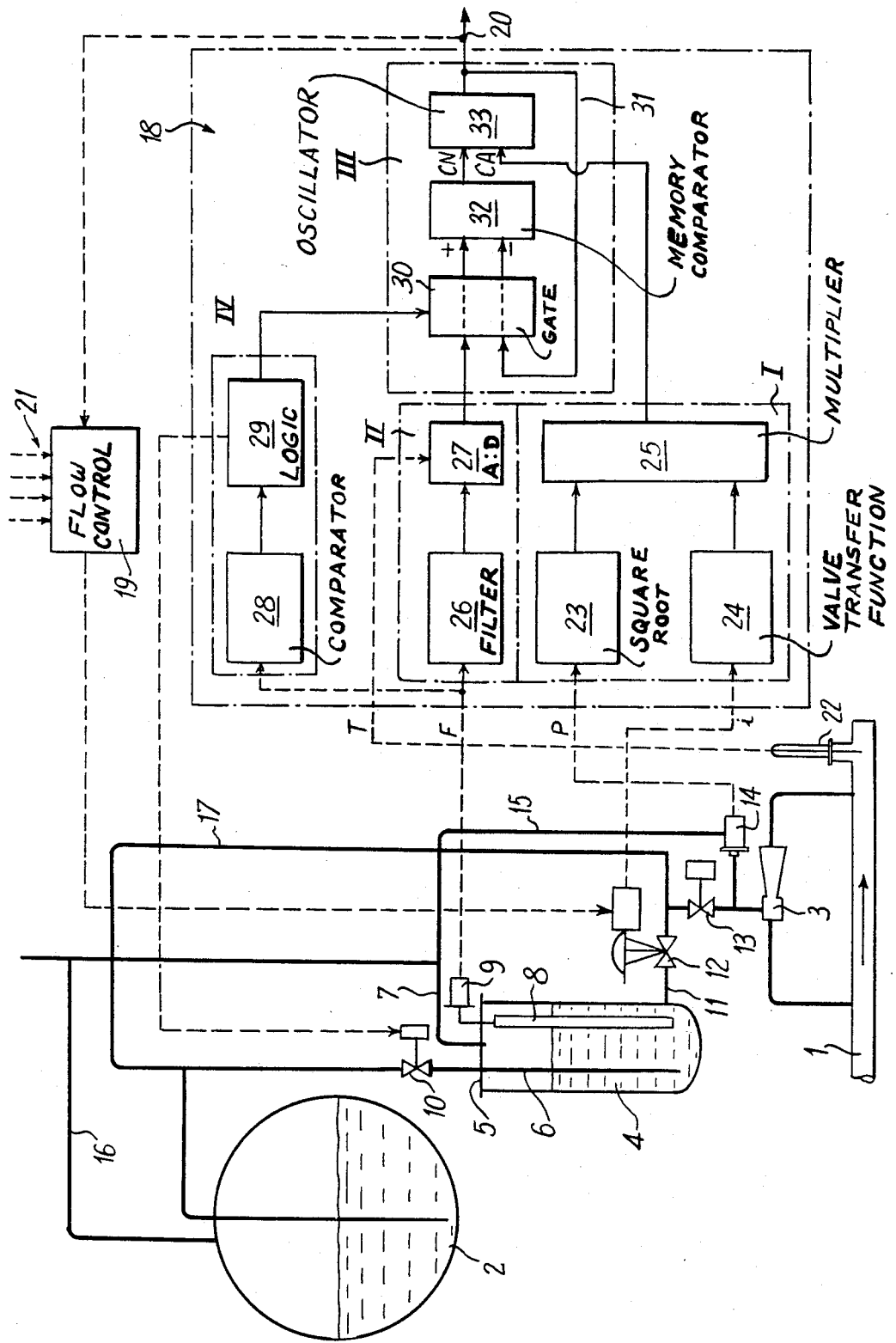

FLOWMETER AND INSTALLATION FOR MIXING AN ADDITIVE IN A LIQUID

The present invention relates to a flowmeter and an installation containing such a flowmeter for mixing an additive in a liquid.

Already known are flowmeters having a tank placed between a discharge circuit in which the flow is to be measured, and a supply circuit from which the tank is refilled when its liquid level falls below a predetermined value, and a plunger suspended in the tank by means of a force sensor.

The tank of such a flowmeter is alternately in a discharge phase and a discharge/refilling phase. During the discharge phase the supply circuit is closed and consequently the level in the tank drops. When this level has reached the predetermined value the supply circuit is opened, the discharge circuit, of course, also remaining open. The supply circuit is so constituted that its rate of flow is much greater than the rate of flow of the discharge circuit, so that the direction of the discharge/refilling phase is relatively short compared to the duration of the discharge phase. When the level of liquid in the tank has reached a new predetermined higher value the supply circuit is again closed so that the flowmeter is again in the discharge phase.

The determination of the rate of flow is accomplished by means of the force sensor. Actually, this latter measures the apparent weight of the plunger, that is, its weight as lessened by the Archimedian pressure or thrust exerted on it by the liquid. The reading on the force sensor is thus representative of the mass or volume of liquid in the tank.

Consequently, to know the mass or volume flow, it is sufficient to obtain this reading.

Such a flowmeter has nevertheless, a significant drawback which resides in the fact that the signal of the force sensor does not indicate the rate of flow during the discharge/refilling cycles. This is evident because the variation of the level of the liquid in the tank results then in the difference between the rate of supply flow and the rate of discharge flow. It has already been suggested as a remedy for this drawback that the rate of flow be considered to be constant, during one cycle of discharge/refilling, and equal to the last value which was taken during the immediately preceding discharge cycle.

This solution is not always completely satisfactory insofar as the rate of flow during the discharge/refilling cycle is only known approximately since no record is kept during this cycle of possible variations no matter how caused.

It has also been suggested to use two tanks arranged so that one is always in the discharge cycle while the other is in the refilling cycle.

This arrangement, however, requires duplicates of many of the components of the flowmeter and the addition of switching gate valves from one circuit to the other, which significantly increases the cost of the flowmeter as well as the risks of breakdown.

The present invention aims to alleviate these drawbacks by providing a flowmeter which has only a single tank, but which records the variations in flow during the discharge/refilling cycle of this tank.

To this end, the invention has as its object a flowmeter of the type having a tank disposed between a discharge circuit in which the flow is to be measured, and a supply circuit from which the tank is refilled when the level of the liquid in it falls below a predetermined value, and a plunger suspended in the tank by means of a force sensor characterized by the fact that it has in combination means independent of the tank and of the plunger which are able to continuously provide a signal approximately representative of the flow, and means to calibrate the said means independently of the tank and the plunger from the information given by the force sensor outside the refilling cycles of the tank.

The flowmeter consequently has a first measuring chain or channel which continuously supplies an indication of the flow, whether the tank is in the discharge cycle or the discharge/refilling cycle.

The imprecision of the measurement thus obtained has no effect on the final results.

Actually, this measurement is calibrated by a second measuring chain or channel at each discharge cycle.

The second measuring chain must, to the contrary, have at least the final precision desired since it is from the values that it supplies during the discharge cycle that the first measuring chain determines the measurement that it supplies during the discharge/refilling cycle.

It will be noted that the present invention does not involve simply switching the flowmeter from a measuring chain independent of the tank and the plunger, to a measuring chain which depends on them, whether the device is in the discharge/refilling cycle or in the discharge cycle.

Actually, such an arrangement would lead to abrupt jumps in the value indicated by the flowmeter, as could happen with flowmeters with two tanks.

To the contrary, the output value from the flowmeter which is the object of the present invention is continuous since it is the output value from the first measuring chain and is calibrated, when the device is in a discharge cycle from the tank, or not calibrated if the device is in a discharge/refilling cycle.

It can also be arranged as will be shown below so that the calibrated output value from the second measuring chain would actually be essentially equal to the output value from the first measuring chain.

The rate of flow from the supply circuit to the tank as well as the volume of this tank are simply determined so that, on the one hand, the discharge cycles are long enough to allow calibration to take place and, on the other hand, the discharge/refilling cycles are not too long since the output from the second measuring chain is not then calibrated.

In one particular embodiment the said means independent of the tank and of the plunger are analog means while the calibrating means are numeric means.

Advantageously, the said means independent of the tank and of the plunger include a gate valve and a pressure sensor disposed in the discharge circuit of the tank.

Actually, it is known that the rate of flow in piping supplied with a gate valve is a function, on the one hand, of the opening of this gate valve and, on the other hand, of its supply pressure.

It will be noted that in this case the first measuring chain of the flowmeter according to the invention measures a volume flow while the second chain obviously measures a mass flow. However, this does not present any drawback even if the flow to be measured is actually the mass flow since the value indicated by the second measuring chain is recalibrated at each discharge cycle. It would be necessary for the density of the fluid whose flow was being measured to vary significantly during one discharge/refilling cycle for the results of the measurement to be altered in terms of mass flow.

Various means may be provided to determine the volume flow from the characteristics of the gate valve and the pressure but one arrangement is particularly useful when this gate valve is a regulator gate valve with electric controls, since then its energizing current is precisely determined and the area of its opening depends directly on it.

In this case, a flowmeter according to the invention preferably includes means for extracting the square root of the value supplied by the pressure sensor, means representative of the transfer function of the gate valve to determine the area of its opening from its energizing current, and means for multiplying the square root by the area of the opening of the gate valve.

Actually, it is known that the volume flow of a gate valve is directly proportional to the product of its area of opening multiplied by the square root of the downstream-upstream differential pressure.

This arrangement particularly allows the taking into account of the variation of the supply pressure to the gate valve resulting from the increase in level in the tank during the discharge/refilling cycle.

For their part, the calibrating means include means for deriving with respect to time the signal coming from the force sensor.

In certain cases it may be useful to filter the signal coming from the force sensor before deriving it. Actually, in the contrary case, anomalies such as vibrations may lead to an erroneous interpretation of the signal from the sensor.

In one particular embodiment of the invention the flowmeter includes means for interrupting the output from the derivation means during the refilling cycles of the tank.

It has actually been noted that the signal coming from the second measuring chain is not significant during the refilling of the tank. Consequently, the output from the derivation means could be interrupted during this cycle.

Advantageously, the flowmeter according to the invention then includes a comparator with a memory able to compare the output value from the flowmeter with the output value from the derivation means and to store in its memory the last output value from the derivation means when the output from the derivation means is interrupted.

This comparator has a double role.

During the discharge cycle its role returns to that of comparing the output values from the two measuring chains in order to accomplish the calibration of the second measuring chain from the first measuring chain.

During the discharge/refilling cycle, this comparator keeps in its memory the last output value from the first measuring chain so that no interruption is revealed at the output of the flowmeter but that, to the contrary, calibration is no longer carried out since a record is no longer being kept of the variation in the output value from the derivation means.

The flowmeter also preferably includes means able to supply a signal representative of the product of the signal supplied by the said means independent of the tank and of the plunger, multiplied by the output value of the comparator with memory.

Thus, the output of the flowmeter, which may correspond to the output of the multiplier, is during the discharge/refilling cycles directly proportional to the output of the first measuring chain. Actually, it has been noted that during this cycle the comparator with memory takes into account only the last value taken by the output of the second measuring chain during the preceding discharge cycle.

To the contrary, during the discharge cycles, this multiplier ensures permanent calibration of the first measuring chain by the second standard measuring chain.

The flowmeter according to the invention may also include means for comparing the output value from the force sensor with a first value corresponding to the minimum level in the tank, and with the second value corresponding to the maximum level in the tank.

In this case, means can be provided for initiating a refilling cycle when the output value from the force sensor reaches the first value and ending this cycle when the output value from the force sensor reaches the second value.

The invention also has as its object an installation for mixing an additive in a liquid, characterized by the fact that it includes a flowmeter as described above in the supply circuit of the additive.

This installation can also include means for determining the energizing current of the gate valve placed in the discharge circuit of the tank, as a function of the measured flow.

In particular, these means may include a dosage or metering programmer which determines the value of the excitation current to the gate valve and, consequently, the rate of flow as a function of the actual flow and possibly of other parameters.

It is also possible to provide a temperature sensor for the liquid and means for correcting the calibration means as a function of the measured temperature.

This is particularly significant when only the volume flow of the liquid to which the additive is to be added is known, since it is then necessary to adjust the mass flow of the additive as a function of the temperature.

Thus, if tetra ethyl lead is to be added to gasoline, the dosage must be for example, 0.4 gr per liter at 15°. But this value varies with the temperature.

Consequently, the invention allows automatic adjustment of the rate of flow of the additive as a function of the temperature of the liquid to which it is added.

These correction means are preferably used to modify the value supplied by the derivation means.

In the particular case in which these derivation means consist of a numerical derivation means, this modifies the quantity of additive corresponding to an impulse at the output of this derivation means.

A non-limiting example of one preferred embodiment of the invention will now be described with reference to the attached schematic drawing which represents a mixing and metering or dosing installation including a flowmeter according to the invention.

This installation includes first of all a pipeline 1 in which there flows the liquid in which it is desired to mix another liquid contained in a storage reservoir 2.

The liquid flowing in pipeline 1 can, for example, be gasoline and the additive can be tetra ethyl lead.

An ejector 3 is mounted in the usual way on pipeline 1 to assure mixing.

The flowmeter according to the invention comprises a tank 4 which in the present case is essentially cylindrical with a cover 5 on its upper portion.

Cover 5 is traversed on the one hand by a supply or feed conduit 6 coming from storage reservoir 2 and, on the other hand, by an air vent conduit 7, which opens to the atmosphere.

A plunger 8 is placed in the usual way in tank 4 to transmit the Archimedian thrust exerted on it to a force sensor 9, for example, a strain measuring gauge.

A feed gate valve 10 is disposed in supply conduit 6 between storage reservoir 2 and tank 4.

A discharge conduit 11 is also connected to the base of tank 4 between this tank and the ejector 3.

On conduit 11 are placed successively on leaving tank 4, a flow regulator valve 12, a safety gate valve 13, and a differential pressure sensor or vacuum transmitter 14 which is also connected to the open air or atmosphere by pipe 15.

Storage reservoir 2 is connected to the open air by 16, while a conduit 17 connected between regulator gate valve 12 and safety gate valve 13, connects discharge conduit 11 to the upper portion of feed conduit 6.

The flowmeter is primed by closing regulator gate valve 12 and opening safety gate valve 13. The reduced pressure caused by ejector 3 by the flow of the fluid in pipeline 1 is transmitted by piping 17 to reservoir 2 and causes the priming.

The flowmeter according to the invention also includes an electronic assembly 18 which will be described in detail below.

Regulator gate valve 12 is controlled or regulated by a flow regulator unit 19 which can be, for example, a calculator or computer one input of which is the output 20 of the flowmeter, the other inputs 21 depending on other parameters of the system such as, for example, the flow in the pipeline.

In the present case, computer 19 provides the energizing current for regulator gate valve 12, which current also constitutes an input i of assembly 18.

Finally, the installation includes a temperature sensor-transmitter 22 which measures the temperature of the liquid flowing in the pipeline.

The output from sensor 22 corresponds to the input T of assembly 18.

The other inputs to electronic assembly 18 are input F from force sensor 9, and input P from vacuum transmitter 14.

Electronic assembly 18 includes generally:

A first processing unit I constituting with vacuum transmitter 14 and the energizing current of regulator gate valve 12, a first measuring chain or channel, A second processing unit II constituting with force sensor 9 a second measuring chain or channel, A calibration unit III, and A control unit IV.

The first processing unit I receives the output P from vacuum transmitter 14 at a square root extractor 23, and the energizing current i of regulator gate valve 12 at circuit 24.

Circuit 24 represents the transfer function of the regulator gate valve so that when its input is the energizing current of this gate valve, its output represents the flow or passage area of the gate valve.

The outputs of square root extractor 23 and of circuit 24 representing the transfer function of regulator gate valve 12 are fed to an analog multiplier 25 whose output CA constitutes the output of the first processing unit I. Consequently, it will be noted that processing unit I multiplies the square root of the pressure downstream from regulator gate valve 12, by the opening area of this gate valve, so that its output is approximately proportional to the volume flow in piping 11 regardless of the state of opening or closing of feed gate valve 10.

The second processing unit II includes first of all a filter 26 which receives the signal coming from force sensor 9 in order to eliminate from it background noise as well as parasitics due, for example, to vibration.

The output from filter 26 is received by a digital deriver 27 whose output constitutes the output of processing unit II.

The output force sensor 9 representing the Archimedian thrust exerted by the liquid in tank 4 on plunger 8 is proportional to the amount of fluid in tank 4. Consequently, when supply gate valve 10 is closed and the liquid in tank 4 flows out through conduit 11 the output of digital deriver 27 represents the flow in conduit 11.

The outputs of the two processing units I and II are fed to the calibrating unit III which will be described in more detail below.

Control circuit IV includes, on the one hand, a level comparator 28 and, on the other hand, a sequential logic circuit 29 which receives the output from comparator 28.

The output of force sensor 9 is fed to the input of comparator 28 which compares this output with a first value corresponding to the minimum level of the liquid in tank 4 and to a second value corresponding to the maximum level.

When the minimum value is detected by comparator 28, the comparator signals sequential logic circuit 29 to open supply gate valve 10, and when the maximum level is detected by comparator 28, the comparator signals sequential logic circuit 29 to close supply gate valve 10.

Another output of the sequential logic circuit is fed to a gate circuit 30 of calibrating unit III which will now be described in detail.

Logic gates 30 receive and transmit, on the one hand, the signal coming from the second processing unit II and, on the other hand, output 20 of the flowmeter by means of a feedback loop 31.

The two outputs from gates 30 are applied to the respective positive and negative inputs of a memory numerical comparator 32.

Comparator 32 thus receives pulses on its two inputs when gates 30 are open.

The pulses received on the positive input have a frequency proportional to the flow measured by force sensor 9 by means of processing chain II and the pulses received on the negative input have a frequency proportional to the flow indicated by the flowmeter. Consequently, it will be noted that when gates 30 are open the output of the flowmeter is locked to the value measured by force sensor 9.

The output CN from comparator 32 is a binary number which, when gates 30 are open, is proportional to the difference between the two inputs and which, when gates 30 are closed, maintains the value which it had immediately prior to the closing of gates 30.

This output from comparator 32 is fed to one input of a programmable oscillator 33 whose other input receives the output from the first processing chain I, that is, the output from multiplier 25.

The programmable oscillator 33 produces at its output, which is output 20 of the flowmeter, pulses whose frequency is proportional to the product of $CN \times CA$.

Consequently, when tank 4 is in a refilling cycle control unit IV opens logic gates 30 so that output 20 of the flowmeter follows the output of pressure sensor 14 by means of first processing unit I as was described above.

When the liquid in tank 4 reaches its lowest level, this is detected by comparator 28 so that control unit IV closes gates 30 and the output CN from comparator 32 becomes constant and equal to its last value.

The programmable oscillator 33 then follows the value of its input CA and consequently varies as a function of the flow as determined by current i and the differential pressure measured by vacuum transmitter 14.

When the liquid in tank 4 again reaches its highest level this is detected by comparator 28 and control unit IV reopens gates 30.

In particular, it will be noted that output 20 of the flowmeter never becomes discontinuous.

This is evident during switching from a discharge cycle to a discharge/refilling cycle since input CN of programmable oscillator 33 remains constant at its last value.

If during a discharge/refilling cycle the flow rate changes, the output of programmable oscillator 33 will vary with the input CA. When, at the end of this discharge/refilling cycle, gates 30 reconnect input CN of oscillator 33, the oscillator will again follow the input CN which will also have been modified as a consequence of the variation in flow. Consequently, there will again be no discontinuity.

Of course, the device described above may undergo variations and modifications without thereby departing from either the scope or the spirit of the invention.

Thus, the memory comparator can take into account an average of the last values of the output from the second measuring chain and not the very last value.

We claim:

1. A flowmeter having a tank disposed between a discharge circuit in which the rate of flow is to be measured and a supply circuit from which the tank is refilled when the liquid level in the tank falls below a predetermined value, and a plunger suspended in the tank via a force sensor providing an output signal indicative of flow from the tank to the discharge circuit, means independent of the tank and the plunger to continuously supply a signal which is approximately representative of the rate of flow in the discharge circuit, and means responsive to said output signal of the force sensor outside of refilling cycles of the tank for calibrating said means independent of the tank and the plunger, so that reasonably accurate flow measurement is obtained during a refilling cycle of the tank.

2. Flowmeter according to claim 1, wherein said means independent of the tank and the plunger comprise analog means.

3. Flowmeter according to claim 1, wherein the calibrating means comprise numerical means.

4. Flowmeter according to claim 1, wherein said means independent of the tank and the plunger to continuously supply a signal includes a pressure sensor and a gate valve in the discharge circuit.

5. Flowmeter according to claim 4, wherein said means independent of the tank and the plunger to continuously supply a signal includes means to derive the square root of the value supplied by the pressure sensor, means representative of the extent of opening of the gate valve to determine its flow area opening from its energizing current, and means for multiplying said square root by the flow area opening of the gate valve.

6. Flowmeter according to claim 1, wherein the calibrating means include means for deriving flow with respect to time from the signal from the force sensor.

7. Flowmeter according to claim 6, further comprising means for interrupting the output of the deriving means during refilling cycles of the tank.

8. Flowmeter according to claim 7, wherein the flowmeter provides a continuous output value and further comprises memory comparator means for comparing the output value from the flowmeter with an output value from the deriving means, and stores the most recent output value from the deriving means when the output from the deriving means is interrupted.

9. Flowmeter according to claim 7, further comprising means to compare the output value from the force sensor with a first value corresponding to the minimum level in the tank, and with a second value corresponding to the maximum level in the tank.

10. Flowmeter according to claim 9, further comprising means to initiate each refilling cycle of the tank when the output value from the force sensor reaches said first value and to end the refilling cycle when the output value from the force sensor reaches said second value.

11. A flowmeter according to claim 1 for use in an installation for mixing an additive in a liquid flowing through a pipeline, and wherein the flowmeter measures the flow of the additive to the liquid in said pipeline.

12. A flowmeter according to claim 11 wherein said means independent of the tank and the plunger to continuously supply a signal includes means for determining the exitation current of a gate valve in the discharge circuit of the tank as a function of the measured rate of flow.

13. A flowmeter according to claim 11 further comprising a temperature sensor for said liquid, and means for correcting said calibrating means as a function of the measured temperature.

* * * * *